(12) United States Patent
Yano et al.

(10) Patent No.: US 11,201,478 B2
(45) Date of Patent: Dec. 14, 2021

(54) MANAGEMENT DEVICE AND POWER SUPPLY SYSTEM FOR IMPROVED CELL VOLTAGE DETECTION ACCURACY

(71) Applicant: SANYO Electric Co., Ltd., Daito (JP)

(72) Inventors: Junya Yano, Hyogo (JP); Tomonori Kunimitsu, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 331 days.

(21) Appl. No.: 16/327,056

(22) PCT Filed: May 10, 2017

(86) PCT No.: PCT/JP2017/017624
§ 371 (c)(1),
(2) Date: Feb. 21, 2019

(87) PCT Pub. No.: WO2018/051574
PCT Pub. Date: Mar. 22, 2018

(65) Prior Publication Data
US 2019/0222036 A1 Jul. 18, 2019

(30) Foreign Application Priority Data
Sep. 13, 2016 (JP) .............................. JP2016-178917

(51) Int. Cl.
*H02J 7/00* (2006.01)
*H01M 10/42* (2006.01)
(Continued)

(52) U.S. Cl.
CPC ............ *H02J 7/0021* (2013.01); *B60L 58/22* (2019.02); *H01M 10/425* (2013.01);
(Continued)

(58) Field of Classification Search
CPC .. H02J 7/0021; H02J 7/00; H02J 7/02; H01M 10/425; H01M 10/482
See application file for complete search history.

(56) References Cited

U.S. PATENT DOCUMENTS 6,104,164 A * 8/2000 Iino ........................ G01R 15/04
320/116
7,592,774 B2 * 9/2009 Morimoto .......... G01R 31/3835
320/116
(Continued)

FOREIGN PATENT DOCUMENTS

| JP | 2011-76777 A | 4/2011 |
| JP | 2014-225950 A | 12/2014 |
| JP | 2016-153731 A | 8/2016 |

OTHER PUBLICATIONS

International Search Report dated Jun. 6, 2017, issued in counterpart International Application No. PCT/JP2017/017624 (1 page).

*Primary Examiner* — John T Trischler
(74) *Attorney, Agent, or Firm* — Westerman, Hattori, Daniels & Adrian, LLP

(57) ABSTRACT

A management device manages an electricity storage module having: a first cell module and a second cell module each including a plurality of cells connected in series; and a conductive connection member for connecting the first cell module and the second cell module in series. A voltage detection circuit is connected to the nodes of the respective cells through voltage detection lines to detect the voltage of each of the cells and the voltage at both ends of the connection member. A control circuit distinguishes between and recognizes the voltage of each of the cells and the voltage at both ends of the connection member, which are detected by the voltage detection circuit.

1 Claim, 4 Drawing Sheets

(51) Int. Cl.
  *H02J 7/02*    (2016.01)
  *B60L 58/22*   (2019.01)
  *H01M 10/48*   (2006.01)
  *H02J 7/34*    (2006.01)

(52) U.S. Cl.
  CPC ............ *H01M 10/482* (2013.01); *H02J 7/00* (2013.01); *H02J 7/0014* (2013.01); *H02J 7/0016* (2013.01); *H02J 7/02* (2013.01); *H01M 2010/4271* (2013.01); *H02J 7/345* (2013.01)

(56) References Cited

U.S. PATENT DOCUMENTS

| | | | | |
|---|---|---|---|---|
| 7,777,453 | B2* | 8/2010 | Yano | H02J 7/0029 320/134 |
| 8,054,043 | B2* | 11/2011 | Yano | B60L 58/22 320/118 |
| 8,228,037 | B2* | 7/2012 | Furukawa | H02J 7/0026 320/134 |
| 8,264,204 | B2* | 9/2012 | Nagaoka | B60L 58/19 320/136 |
| 8,269,460 | B2* | 9/2012 | Ishikawa | G01R 31/396 320/122 |
| 8,436,585 | B2* | 5/2013 | Yano | B60L 58/13 320/132 |
| 8,742,619 | B2* | 6/2014 | Ohkura | H02J 7/0016 307/43 |
| 8,878,492 | B2* | 11/2014 | Furukawa | H01M 10/425 320/116 |
| 8,957,665 | B2* | 2/2015 | Hayakawa | G01R 19/16542 324/76.11 |
| 8,970,062 | B2* | 3/2015 | Kunimitsu | B60L 58/14 307/10.7 |
| 8,981,722 | B2* | 3/2015 | Miura | B60L 58/14 320/118 |
| 8,981,783 | B2* | 3/2015 | Fujimatsu | G01R 31/3835 324/434 |
| 9,081,069 | B2* | 7/2015 | Shibata | G01R 19/16542 |
| 9,128,138 | B2* | 9/2015 | Nozawa | G01R 31/007 |
| 9,296,348 | B2* | 3/2016 | Yano | B60L 53/63 |
| 9,329,239 | B2* | 5/2016 | Kunimitsu | H02J 7/0021 |
| 9,562,949 | B2* | 2/2017 | Kuroda | G01R 31/396 |
| 9,575,129 | B2* | 2/2017 | Sugimura | G01R 31/3835 |
| 9,577,458 | B2* | 2/2017 | Kaita | H02J 7/0021 |
| 9,941,712 | B2* | 4/2018 | Kaita | B60L 58/15 |
| 9,948,116 | B2* | 4/2018 | Matsumoto | B60L 3/12 |
| 10,044,199 | B2* | 8/2018 | Matsumoto | H02J 7/0021 |
| 10,096,992 | B2* | 10/2018 | Kaita | H02H 7/18 |
| 10,158,241 | B2* | 12/2018 | Tanabe | H02J 7/00 |
| 10,164,442 | B2* | 12/2018 | Kaita | H02J 7/0029 |
| 10,490,865 | B2* | 11/2019 | Kubo | H01M 10/4285 |
| 10,495,695 | B2* | 12/2019 | Hashimoto | G01R 31/396 |
| 10,502,795 | B2* | 12/2019 | Sugimura | H01M 10/425 |
| 10,680,448 | B2* | 6/2020 | Yano | H02J 7/0016 |
| 10,833,513 | B2* | 11/2020 | Coenen | H01M 10/392 |
| 10,886,579 | B2* | 1/2021 | Tanabe | H01M 10/425 |
| 10,895,603 | B2* | 1/2021 | Kiuchi | B60L 3/0046 |
| 10,981,452 | B2* | 4/2021 | Nook | H02J 1/122 |
| 2005/0264264 | A1* | 12/2005 | Yano | G01R 31/50 320/132 |
| 2007/0029967 | A1* | 2/2007 | Morimoto | G01R 31/3835 320/116 |
| 2009/0267566 | A1* | 10/2009 | Yano | B60L 58/22 320/118 |
| 2009/0309545 | A1* | 12/2009 | Kunimitsu | H02J 7/0016 320/118 |
| 2010/0127663 | A1* | 5/2010 | Furukawa | B60L 50/51 320/134 |
| 2010/0327878 | A1* | 12/2010 | Ishikawa | B60L 50/16 324/537 |
| 2011/0089905 | A1* | 4/2011 | Yano | H01M 10/486 320/132 |
| 2011/0101920 | A1* | 5/2011 | Seo | H01M 50/502 320/127 |
| 2011/0234162 | A1* | 9/2011 | Kinoshita | H01M 10/482 320/116 |
| 2011/0298424 | A1* | 12/2011 | Yamauchi | B60L 58/18 320/118 |
| 2012/0161677 | A1* | 6/2012 | Kunimitsu | H01M 10/482 318/139 |
| 2012/0161708 | A1* | 6/2012 | Miura | B60L 50/16 320/118 |
| 2012/0194135 | A1* | 8/2012 | Mizoguchi | G01R 31/396 320/118 |
| 2012/0306507 | A1* | 12/2012 | Fujimatsu | G01R 31/396 324/434 |
| 2013/0002016 | A1* | 1/2013 | Furukawa | H01M 10/425 307/9.1 |
| 2013/0076129 | A1* | 3/2013 | Kunimitsu | B60L 58/15 307/10.7 |
| 2013/0181513 | A1* | 7/2013 | Yano | B60L 50/62 307/10.1 |
| 2013/0187610 | A1* | 7/2013 | Hayashi | H02J 7/00 320/118 |
| 2014/0021960 | A1* | 1/2014 | Sugimura | H01M 10/482 324/434 |
| 2014/0111160 | A1* | 4/2014 | Nozawa | H02J 7/0026 320/118 |
| 2014/0210612 | A1* | 7/2014 | Shibata | G01R 19/16542 340/521 |
| 2014/0306662 | A1* | 10/2014 | Kim | H02J 7/007 320/118 |
| 2015/0037656 | A1* | 2/2015 | Noda | H01M 10/425 429/149 |
| 2015/0229143 | A1* | 8/2015 | Kaita | B60L 7/14 320/118 |
| 2015/0229154 | A1* | 8/2015 | Kaita | H02J 7/0031 320/118 |
| 2015/0255979 | A1* | 9/2015 | Kaita | H02H 7/18 361/90 |
| 2015/0260799 | A1* | 9/2015 | Kuroda | G01R 31/396 324/434 |
| 2015/0357856 | A1* | 12/2015 | Tanabe | H02J 7/00 320/163 |
| 2016/0241054 | A1* | 8/2016 | Matsumoto | H01M 10/34 |
| 2016/0254683 | A1* | 9/2016 | Matsumoto | B60L 58/22 320/118 |
| 2017/0115357 | A1* | 4/2017 | Sugimura | H01M 10/482 |
| 2017/0117596 | A1* | 4/2017 | Kubo | G01R 31/396 |
| 2017/0125995 | A1* | 5/2017 | Nishi | H02J 7/0063 |
| 2018/0106865 | A1* | 4/2018 | Hashimoto | G01R 31/50 |
| 2018/0217206 | A1* | 8/2018 | Kiuchi | B60L 3/0046 |
| 2019/0074699 | A1* | 3/2019 | Yano | H02J 7/0047 |
| 2019/0198944 | A1* | 6/2019 | Tanabe | G01R 31/396 |
| 2019/0285669 | A1* | 9/2019 | Furukawa | H01M 10/48 |
| 2019/0293725 | A1* | 9/2019 | Tsuchiya | G01R 31/3644 |
| 2019/0324091 | A1* | 10/2019 | Sato | H01M 10/48 |
| 2019/0391209 | A1* | 12/2019 | Kouda | G01R 31/396 |
| 2020/0081071 | A1* | 3/2020 | Sugimura | H01M 10/482 |
| 2020/0136366 | A1* | 4/2020 | D'Angelo | H02H 9/041 |
| 2021/0231707 | A1* | 7/2021 | Ock | H02J 7/007 |

* cited by examiner

MANAGEMENT DEVICE AND POWER SUPPLY SYSTEM FOR IMPROVED CELL VOLTAGE DETECTION ACCURACY

The present invention relates to a management device for managing a state of a power storage module including batteries, and a power supply system including the management device.

BACKGROUND ART

In recent years, hybrid vehicles (HV), plug-in hybrid vehicles (PHV), and electric vehicles (EV) are being spread. Secondary batteries as a key device are installed in these vehicles. As secondary batteries for the vehicle, the nickel hydride batteries and the lithium ion batteries are spread. In the future, it is expected that spread of the lithium ion batteries having high energy density are accelerated.

Since the operable voltage range and the prohibited voltage range in the lithium ion batteries are close, the stricter voltage management is necessary in the lithium ion batteries than other types of batteries. When an assembled battery in which a plurality of the lithium ion battery cells are connected in series is used, a voltage detection circuit is provided for detecting each of the battery cells. Each node of the plurality of cells and the voltage detection circuit are connected by a plurality of voltage detection lines (for example, refer to Patent Literatures 1). The detected voltages are used for a state-of-charge (SOC) management, an equalization control, and the like.

CITATION LIST

Patent Literature

Patent Literature 2: Unexamined Japanese Patent Publication No. 2011-76777

SUMMARY OF THE INVENTION

Technical Problem

A plurality of cells connected in series constitute a cell module, and the cell modules are connected in series by a connection member, for example, a cable or a bus bar. At a time of charging or discharging of the cells, a voltage drop occurs at the connection member. Therefore, a detected voltage of the cell adjacent to the connection member includes an error which is caused by the voltage drop of the connection member, and there is a case where it is difficult to accurately detect the cell voltage.

The present disclosure is developed for solving such requirements. It is an object of the present disclosure to provide a technology in which a management device can accurately detect a cell voltage and also be simplified.

To solve the above-mentioned requirements, a management device of one aspect of the present invention, for managing a power storage module including: a first cell module and a second cell module each including a plurality of cells connected in series; and a conductive connection member for connecting the first cell module and the second cell module in series, includes: a voltage detection circuit that is connected to each of the nodes of the cells through voltage detection lines to detect the voltage of each of the cells and the voltage at both ends of the connection member; and a control circuit that distinguishes between and recognizes the voltage of each of the cells and the voltage at both ends of the connection member, which are detected by the voltage detection circuit.

According to the present invention, the management device can accurately detect a cell voltage and also be simplified.

DESCRIPTION OF EMBODIMENTS

First Exemplary Embodiment

Figure 1:
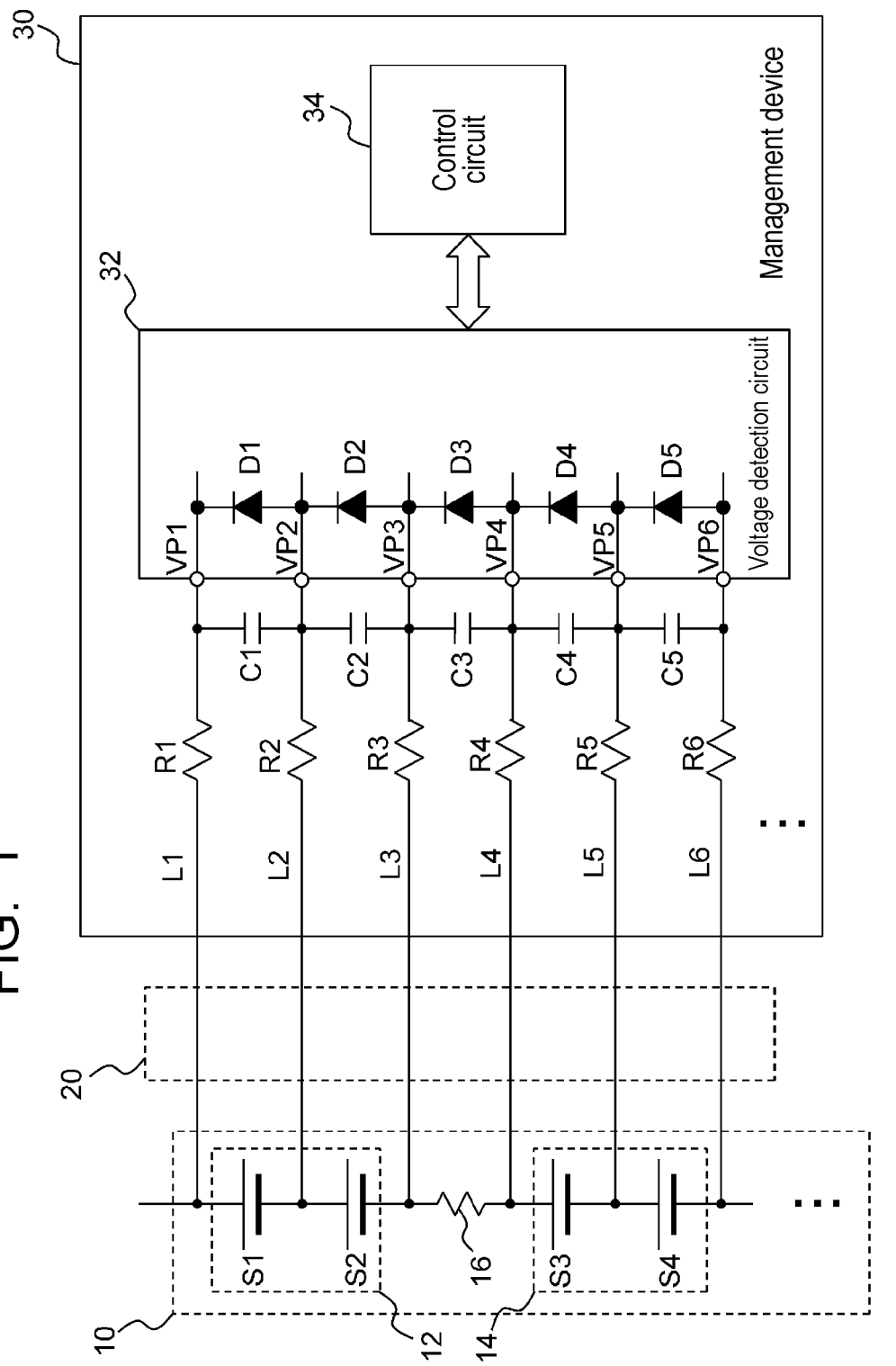
FIG. 1 is a block diagram illustrating a configuration of a power supply system according to a first exemplary embodiment.

FIG. 1 is a block diagram illustrating a configuration of a power supply system according to a first exemplary embodiment. Power supply system 1 includes power storage module 10 and management device 30. Power storage module 10 and management device 30 are connected by wire harness 20. Power supply system 1 can be installed, for example, in a vehicle such as a hybrid vehicle or an electric vehicle to serve as a driving power source for the vehicle.

Power storage module 10 includes first cell module 12, second cell module 14, and connection member 16. First cell module 12 and second cell module 14 each includes a plurality of cells connected in series. A lithium ion battery cell, a nickel hydride battery cell, a lead battery, an electric double layer capacitor cell, a lithium ion capacitor cell, or the like can be used for the cells. In this exemplary embodiment, first cell module 12 includes two cells S1, S2 connected in series, second cell module 14 includes two cells S3, S4 connected in series. Herein, it is assumed to use lithium ion batteries as the battery cells.

Connection member 16 is a conductive member having a connecting function, for example, a cable or a bus bar, and connects first cell module 12 and second cell module 14. Power storage module 10 may include one or more other modules which have the same configuration as first cell module 12 and second cell module 14. In this case, second cell module 14 and the other modules are connected by another connection member, and the other modules are connected by the other connection member.

Management device 30 includes a plurality of resistors R1-R6, a plurality of capacitors C1-C5, voltage detection circuit 32, and control circuit 34. Management device 30 manages power storage modules 10. Management device 30, for example, is provided on a printed wiring board.

Voltage detection circuit 32 is connected to the nodes of respective series-connected cells S1-S4 through voltage detection lines L1-L6, to detect the voltage of each of cells S1-S4 and the voltage at both ends of the connection member 16. Concretely, voltage detection circuit 32 includes a plurality of voltage input terminals VP1-VP6 which are respectively connected to the nodes in the plurality of cells S1-S4, by voltage detection lines L1-L6, voltage detection circuit 32 detects a voltage between the adjacent two of the input terminals. Each of detected voltages of cells S1-S4 and the voltage at both ends of connection member 16 is transmitted to control circuit 34. Voltage detection circuit 32 is configured of discrete parts, an ASIC (Application Specific Integrated Circuit) as the specific custom IC, or the like. Voltage detection lines L1-L6 are configured of, printed wirings inside management device 30, and wire harness 20 outside management device 30.

Voltage detection circuit 32 includes diodes D1-D5 for protection which are respectively connected between adjacent two of the input terminals. Namely, diodes D1-D5 are respectively connected in parallel to cells S1-S4 and connection member 16 in a reverse direction.

A voltage of both ends of connection member 16 at a time of discharging cells S1-S4, is equal to or less than a forward voltage of diode D3 which is connected between both ends of connection member 16.

Resistors R1-R6 are respectively inserted in voltage detection lines L1-L6, and capacitors C1-C5 are respectively connected between the adjacent two lines of the voltage detection lines. Resistors R1-R6 and capacitors C1-C5 constitute low-pass filters, and stabilize the voltages inputted in voltage detection circuit 32.

Control circuit 34 can be pre-set so as to distinguish and recognize the voltage at both ends of connection member 16 among the voltages transmitted from voltage detection circuit 32. Such a pre-set can be carried out a register of control circuit 34. Therefore, control circuit 34 distinguishes between and recognizes the voltage of each of cells S1-S4 and the voltage at both ends of connection member 16, which are detected by the voltage detection circuit 32.

Controlling circuit 34 carries out battery controlling of equalizing control of the cell voltages or the like, referring to the voltages of cells S1-S4 transmitted from voltage detection circuit 32. In addition, when controlling circuit 34 detects the abnormality of the voltages of cells S1-S4, controlling circuit 34 determines that the cell has the abnormality, and notifies a higher rank controller (not shown in the figures) of a first abnormal detection signal which shows the abnormality of the voltage. Concretely, when any one of the voltages of cells S1-S4 is out of the predetermined voltage range, controlling circuit 34 outputs the first abnormal detection signal. Further, when the higher rank controller is notified of the first abnormal detection signal, the higher rank controller carries out a necessary countermeasure of stopping the charge and discharge of power storage module 10 or the like.

The voltage at both ends of connection member 16 is different from each of the voltages of cells S1-S4. So, in a case where control circuit 34 does not distinguish between and recognize the voltage of each of cells S1-S4 and the voltage at both ends of connection member 16, control circuit 34 might wrongly carry out equalizing control of the cell, based on the voltage at both ends of connection member 16. Then, the voltage at both ends of connection member 16 is lower than the voltage of each of cells S1-S4, and there is a possibility that this voltage is out of the above-described voltage range. So, in a case where control circuit 34 does not distinguish between and recognize the voltage of each of cells S1-S4 and the voltage at both ends of connection member 16, control circuit 34 may wrongly determine that the cell has the abnormality. In this exemplary embodiment, such a wrong operation can be prevented.

Control circuit 34 determines the abnormality of connection member 16, based on the voltage at both ends of connection member 16. Concretely, when the voltage at both ends of connection member 16 is higher than the predetermined threshold voltage, controlling circuit 34 determines that connection member 16 has the abnormality, and notifies the higher rank controller (not shown in the figures) of a second abnormal detection signal which shows the abnormality of connection member 16. As this situation, it is thought that, connection member 16 is insufficiently fastened to cells S2, S3 by screws, and then a resistance of connection member 16 is increased more than usually. The higher rank controller is notified of the second abnormal detection signal, and displays a massage of showing the abnormality of connection member 16 on the instrument panel of the vehicle as a necessary measure. Controlling circuit 34 is configured of a CPU, a logic circuit, or their combination.

Here, power supply system 1X of a comparative example is explained.

Figure 2:
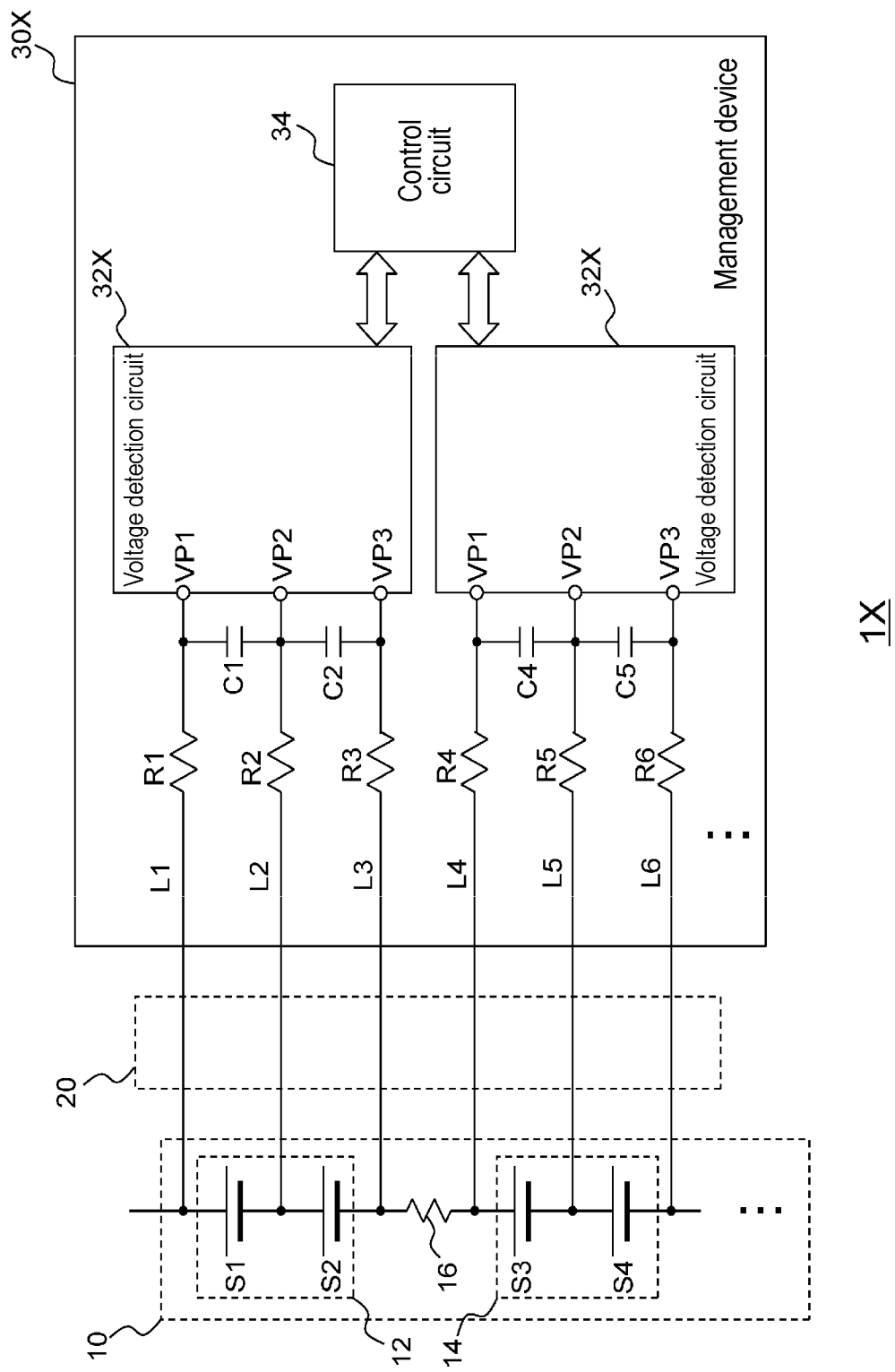
FIG. 2 is a block diagram illustrating a configuration of a power supply system of a comparative example.

FIG. 2 is a block diagram illustrating a configuration of power supply system 1X of the comparative example. In power supply system 1X of the comparative example, management device 30X has two of the same voltage detection circuits 32X. Two of voltage detection circuits 32X are connected to power storage module 10, while avoiding connection member 16. Namely, first cell module 12 at the higher side of connection member 16 and second cell module 14 at the lower side of connection member 16 are respectively connected to different voltage detection circuits 32X. Thus, the voltages of cells S1-S4 can be precisely detected without being affected by the voltage at both ends of connection member 16. However, in the configuration of the comparative example, it is necessary to make small the unit block which is detected by one voltage detection circuit 32X, and a plurality of voltage detection circuits 32X are necessary, and a size of the board becomes large.

On the contrary to this, in this exemplary embodiment, one voltage detection circuit 32 detects the voltage of each of cells S1-S4 and the voltage at both ends of connection member 16, and the detected voltage of each of cells S1-S4 and the voltage at both ends of connection member 16 are distinguished and recognized. Thus, the voltages of cells S1-S4 which are more than the cells of the comparative example, can be precisely detected by one voltage detection circuits 32, without being affected by the voltage at both ends of connection member 16.

Namely, compared with the comparative example, the unit block which is detected by one voltage detection circuit 32, can be made big, and a plurality of cell modules which are depressively disposed can be used. Thus, the number of parts of management device 30 can be reduced, and a size of the board of management device 30 can be made small. Therefore, management device 30 can be compact and inexpensive. Accordingly, while precisely detecting the cell voltage, management device 30 can be simplified.

Figure 3:
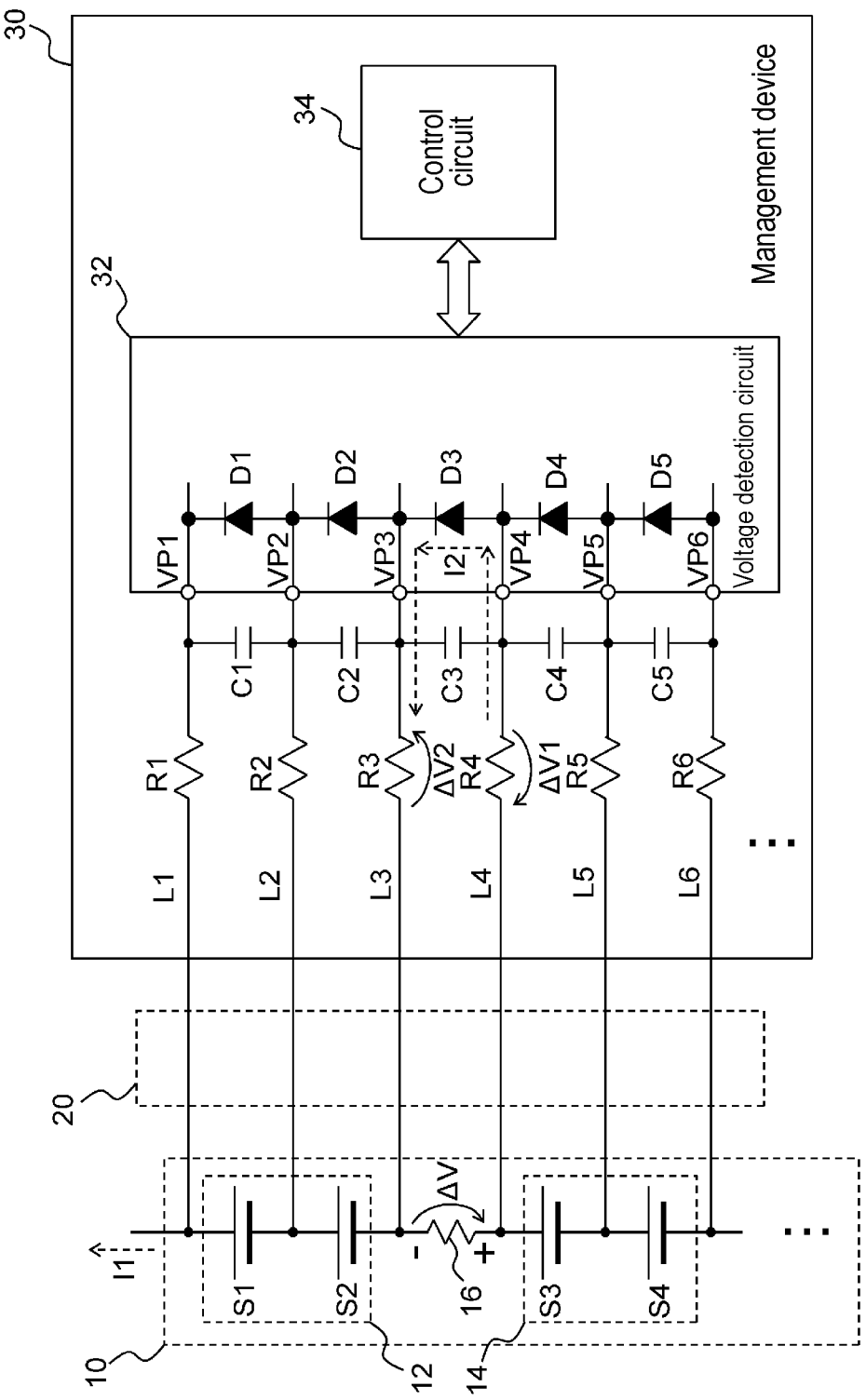
FIG. 3 is a block diagram illustrating an operation in the first exemplary embodiment when the voltage at both ends of a connection member is higher than a forward voltage of a diode.

Here, prior to the explanation of a second exemplary embodiment, an operation is explained of the first exemplary embodiment when the voltage at both ends of connection member 16 is higher, referring to FIG. 3.

FIG. 3 is a block diagram illustrating the operation of the first exemplary embodiment when the voltage $\Delta V$ at both ends of connection member 16 is higher than a forward voltage of diode D3. At a time of discharging of cells S1-S4, current I1 flows from power storage module 10, and a current also flows through connection member 16. At the time of discharging of cells S1-S4, when the voltage $\Delta V$ at both ends of connection member 16 is higher than the forward voltage of diode D3, a forward current flows through diode D4. Accordingly, current I2 flows from the node of the higher voltage side of connection member 16 to the node of the lower voltage side of connection member 16, through resistor R4, diode D3, and resistor R3 in this order. Thus, the voltage ΔV1 occurs in resistor R4, and the voltage ΔV2 occurs in resistor R3. Therefore, the voltage between input terminal VP2 and input terminal VP3, is "the voltage of cell S2"—"the voltage ΔV2", and then the detection accuracy is deteriorated. Similarly, the voltage between input terminal VP4 and input terminal VP5, is "the voltage of cell S3"—"the voltage ΔV1", and then the detection accuracy is deteriorated.

In the second exemplary embodiment explained below, even in a case where the voltage at both ends of connection member 16 is higher, the detection accuracy is prevented from being deteriorated.

Second Exemplary Embodiment

The second exemplary embodiment is different from the first exemplary embodiment in the following. Input terminal VP3 adjacent to the upper side of input terminal VP4 and input terminal VP6 adjacent to the lower side of input terminal VP5, which are connected to both ends of connection member 16, are also connected to connection member 16. The points different from the first exemplary embodiment will be explained below.

Figure 4:
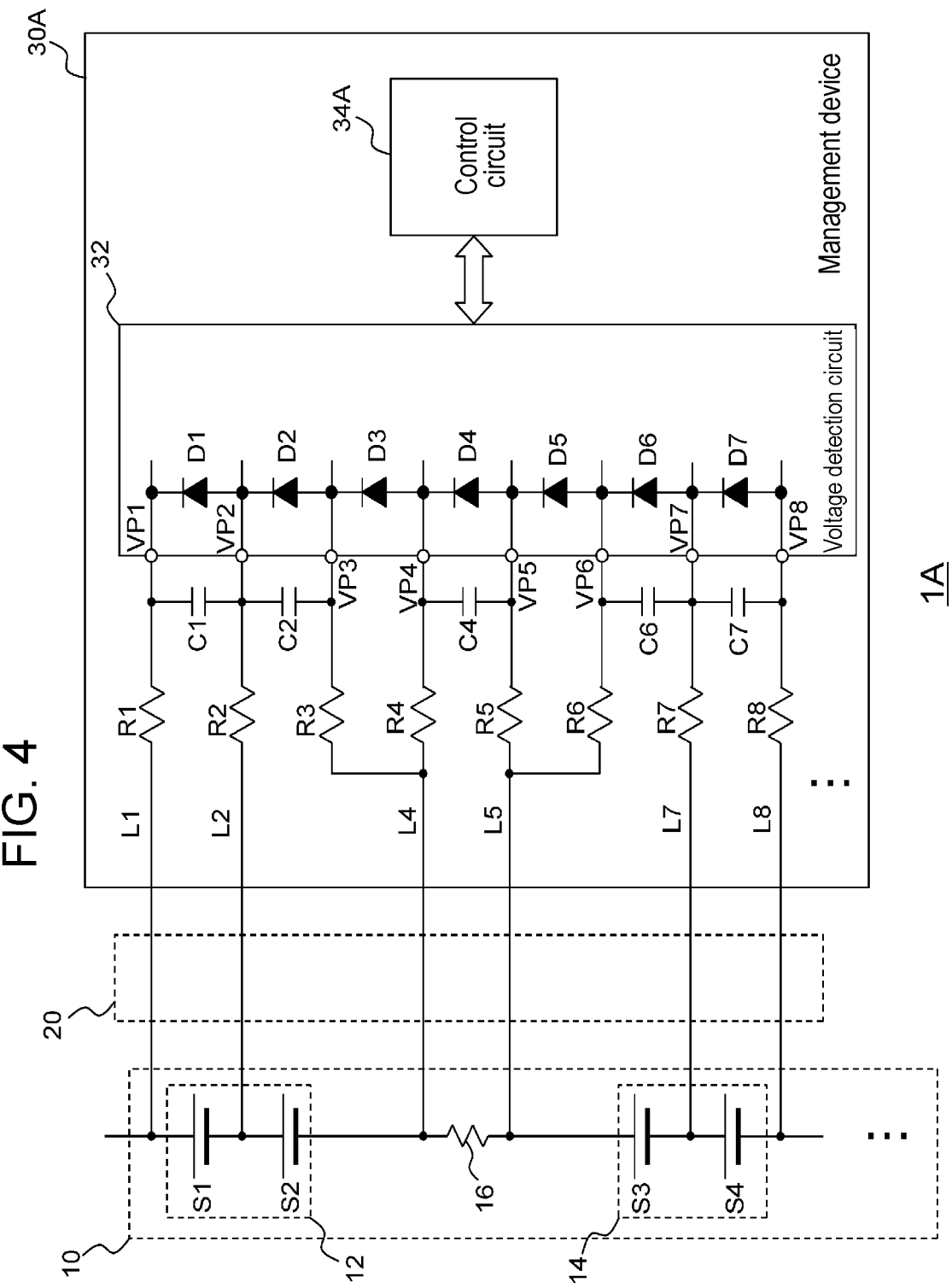
FIG. 4 is a block diagram illustrating a configuration of a power supply system according to a second exemplary embodiment.

FIG. 4 is a block diagram illustrating a configuration of power supply system 1A according to the second exemplary embodiment. Voltage detection circuit 32 is different from FIG. 1 in the numbers of the input terminals and the diodes, but has the same fundamental configuration as FIG. 1. Here, in order to clarify the explanation, input terminals VP1-VP8 are described as first-eighth input terminals VP1-VP8, and resistors R1-R8 are described as first-eighth resistors R1-R8.

First-eighth input terminals VP1-VP8 are respectively connected to the nodes corresponding to cells S1-S4, by voltage detection lines L1, L2, L4, L5, L7, L8. The upper (=positive electrode side) node of cell S2 adjacent to an upper side of connection member 16, is connected to second input terminal VP2 via second resistor R2, by voltage detection line L2. The upper node of connection member 16, is connected to third input terminal VP3 via third resistor R3, by voltage detection line L4, and is connected to fourth input terminal VP4 via fourth resistor R4.

The lower node of connection member 16, is connected to fifth input terminal VP5 via fifth resistor R5, by voltage detection line L5, and is connected to sixth input terminal VP6 via sixth resistor R6. The lower (=negative electrode side) node of cell S3 adjacent to a lower side of connection member 16, is connected to seventh input terminal VP7 via seventh resistor R7, by voltage detection line L7.

In the example shown in the figure, the capacitor is not connected between third input terminal VP3 and fourth input terminal VP4, and between fifth input terminal VP5 and sixth input terminal VP6. As explained below, that is the reason why the voltages between these input terminals are not used and it is not necessary to stabilize the voltages.

This configuration is expressed by being generalized in the following, as n being an integer of six or more. Voltage detection circuit 32 includes first-nth input terminals which are respectively connected to the nodes corresponding to the cells, by the voltage detection lines.

The upper node of the cell adjacent to an upper side of connection member 16 is connected to the i-th input terminal via an i-th resistor, i being an integer of any one of 1 to n−5. The upper node of connecting member 16 is connected to the i+1th input terminal via an i+1th resistor, and is connected to the i+2th input terminal via an i+2th resistor.

The lower node of connecting member 16 is connected to the i+3th input terminal via an i+3th resistor, and is connected to the i+4th input terminal via an i+4th resistor. The lower node of the cell adjacent to a lower side of connecting member 16 is connected to the i+5th input terminal via an i+5th resistor. The example of FIG. 4 is a case of n=8 and i=2.

Here, an operation is explained in the following case. This case is a case when a voltage of both ends of connection member 16 at a time of discharging cells S1-S4 is higher than a forward voltage of diode D4. As explained above, in this case, at the time of discharging cells S1-S4, a current flows from the node of the higher voltage side of connection member 16 to the node of the lower voltage side of connection member 16, through fifth resistor R5, diode D4, and fourth resistor R4 in this order. Thereby, voltages are generated at fourth resistor R4 and fifth resistor R5.

Here, the voltage of fourth resistor R4 does not affect a voltage between second input terminal VP2 and third input terminal VP3 detected by voltage detection circuit 32, that is, a detected voltage of cell S2. That is the reason why third input terminal VP3 is connected to the lower node of cell S2 via third resistor R3 and has no relation to the voltage of fourth resistor R4. Similarly, the voltage of fifth resistor R5 does not affect a voltage between sixth input terminal VP6 and seventh input terminal VP7 detected by voltage detection circuit 32, that is, a detected voltage of cell S3. That is the reason why sixth input terminal VP6 is connected to the upper node of cell S3 via sixth resistor R6 and has no relation to the voltage of fifth resistor R5. Accordingly, the detection accuracy in the voltages of cells S2 and S3 is not deteriorated.

Even when the voltage at both ends of connection member 16 is equal to or less than the forward voltage of diode D4 at the time of discharging of cells S1-S4, the detection accuracy is not deteriorated.

Control circuit 34A can be pre-set so as to determine which voltage is the voltage at both ends of connection member 16, among the voltages transmitted from voltage detection circuit 32. Also, control circuit 34A can be pre-set so as to determine which voltage is the voltage between third input terminal VP3 and fourth input terminal VP4, or between fifth input terminal VP5 and sixth input terminal VP6, among the voltages transmitted from voltage detection circuit 32. Therefore, control circuit 34A distinguishes between and recognizes: the voltage of each of cells S1-S4; the voltage at both ends of connection member 16; the voltage between third input terminal VP3 and fourth input terminal VP4; and the voltage between fifth input terminal VP5 and sixth input terminal VP6, which are detected by the voltage detection circuit 32.

Control circuit 34A recognizes: the voltage between third input terminal VP3 and fourth input terminal VP4; and the voltage between fifth input terminal VP5 and sixth input terminal VP6, as useless or meaningless voltages. Control circuit 34A does not use these in the abnormality determination. Therefore, control circuit 34A does not carry out the wrong or incorrect abnormality determination. When the abnormality of each voltage of cells S1-S4 is detected, control circuit 34A can determine the abnormality of the cell. When the abnormality of the voltage at both ends of connection member 16 is detected, control circuit 34A can determine the abnormality of connection member 16.

According to this exemplary embodiment, even when the voltage at both ends of connection member 16 is higher than the forward voltage of diode D4, the detection accuracy of the cell voltage can be prevented from being deteriorated. This exemplary embodiment can also produce effects shown in the first exemplary embodiment.

Here, depending on whether or not there is a possibility that the voltage at both ends of connection member 16 becomes higher than the forward voltage of the diode according to the change of the charging/discharging current and the environmental temperature, it can be decided which circuit configuration of the first exemplary embodiment and the second exemplary embodiment is utilized. When there is the possibility that the voltage at both ends of connection member 16 becomes higher than the forward voltage of the diode, the second exemplary embodiment is utilized. When there is no possibility that the voltage at both ends of connection member 16 becomes higher than the forward voltage of the diode, the first exemplary embodiment is utilized.

The present invention has been described based on the exemplary embodiments. A person of the ordinary skill in the art can understand that the exemplary embodiment is illustrative only, constitution elements and combined processes can be modified, and such modified examples are covered by the scope of the present invention.

In the above-mentioned exemplary embodiment, the example is assumed that power supply system 1, 1A is used for a power source device for vehicles. However, the power storage system is not limited to use for vehicles, and then can be used as the power source device for airplanes, for ships, for stationary types, or for other uses.

Further, control circuit 34, 34A does not have a function to determine the abnormality of connection member 16, and may recognize or treat the voltage at both ends of connection member 16 as a useless or meaningless voltage. In this case, the first exemplary embodiment may not have capacitor C3, and the second exemplary embodiment may not have capacitor C4. This modified example can simplify the configuration and the control further.

The exemplary embodiment may be specified by items described below.

Item 1

In the management device (30, 30A) for managing an electricity storage module (10) having: a first cell module (12) and a second cell module (14) each including a plurality of cells connected in series; and a conductive connection member (16) for connecting the first cell module (12) and the second cell module (14) in series, the management device (30, 30A) includes:

a voltage detection circuit (32) that is connected to each of the nodes of the cells (S1-S4) through voltage detection lines (L1-L8) to detect the voltage of each of the cells (S1-S4) and the voltage at both ends of the connection member (16); and a control circuit (34, 34A) that distinguishes between and recognizes the voltage of each of the cells (S1-S4) and the voltage at both ends of the connection member (16), which are detected by the voltage detection circuit (32).

Accordingly, while precisely detecting the cell voltage, the management device (30, 30A) can be simplified.

Item 2

In the management device (30, 30A) according to item 1, the control circuit (34, 34A) determines an abnormality of the connection member (16) based on the voltage at both ends of the connection member (16).

According to this, the abnormality of the connection member (16) can be detected.

Item 3

In the management device (30) according to item 1 or 2, the voltage detection circuit (32) is connected to each of the nodes of the cells (S1-S4) by the voltage detection lines (L1-L6) via a resistor (R1-R6), the voltage detection circuit (32) includes diodes (D1-D5) which are respectively connected in parallel to the cells (S1-S4) and the conductive connection member (16) in a reverse direction, and a voltage of both ends of the conductive connection member (16) at a time of discharging the cells (S1-S4), is equal to or less than a forward voltage of diode (D3) which is connected between both ends of connection member (16).

Accordingly, the deterioration of the detection accuracy of the cell voltage by the diode (D3) for protection and resistors (R3, R4) for a filter, can be suppressed.

Item 4

In the management device (30A) according to item 1 or 2, the voltage detection circuit (32) includes:

first to nth input terminals (VP1-VP8) which are respectively connected to the nodes of the cells (S1-S4) by the voltage detection lines (L1-L8), n being an integer of six or more, and diodes (D1-D7) which are respectively connected in reverse directions between adjacent two of the input terminals (VP1 and VP2, VP2 and VP3, VP3 and VP4, VP4 and VP5, VP5 and VP6, VP7 and VP8), the voltage detection circuit (32) detects a voltage between the adjacent two of the input terminals (VP1 and VP2, VP2 and VP3, VP3 and VP4, VP4 and VP5, VP5 and VP6, VP7 and VP8), the upper node of the cell (S2) adjacent to an upper side of the connection member (16) is connected to the i-th input terminal (VP2) via an i-th resistor (R2), i being an integer of any one of 1 to n−5, the upper node of the connection member (16) is connected to the i+1th input terminal (VP3) via an i+1th resistor (R3), and is connected to the i+2th input terminal (VP4) via an i+2th resistor (R4), the lower node of the connection member (16) is connected to the i+3th input terminal (VP5) via an i+3th resistor (R5), and is connected to the i+4th input terminal (VP6) via an i+4th resistor (R6), the lower node of the cell (S3) adjacent to a lower side of the connection member (16) is connected to the i+5th input terminal (VP7) via an i+5th resistor (R7).

Accordingly, regardless of the voltage at both ends of the connection member (16), the deterioration of the detection accuracy of the cell voltage can be suppressed.

Item 5

In the management device (30A) according to item 4,
the control circuit (34A) recognizes:
- a voltage between the i+1th input terminal (VP3) and the i+2th input terminal (VP4), detected by the voltage detection circuit (32) and
- a voltage between the i+3th input terminal (VP5) and the i+4th input terminal (VP6), detected by the voltage detection circuit (32)

as useless voltages.

Accordingly, the wrong or incorrect abnormality determination cannot be carried out.

Item 6

A power supply system (1, 1A) includes:
a power storage module (10) including: a first cell module (12) and a second cell module (14) each including a plurality of cells connected in series; and a conductive connection member (16) for connecting the first cell module (12) and the second cell module (14) in series, and the management device (30, 30A) according to any one of items 1 to 5, which manages the power storage module (10).

Accordingly, while precisely detecting the cell voltage, the power supply system (1, 1A) can be simplified.

The invention claimed is:

1. A management device for managing a power storage module including:
    a first cell module and a second cell module each including a plurality of cells connected in series; and a conductive connection member for connecting the first cell module and the second cell module in series,
    the management device comprising:
    a voltage detection circuit that is connected to nodes of each of the cells through voltage detection lines to detect the voltage of each of the cells and the voltage at both ends of the conductive connection member; and
    a control circuit that distinguishes between and recognizes the voltage of each of the cells and the voltage at both ends of the conductive connection member, which are detected by the voltage detection circuit,
    wherein the voltage detection circuit includes:
    first to nth input terminals which are respectively connected to the nodes of the cells by the voltage detection lines, n being an integer of six or more, and
    diodes which are respectively connected in reverse directions between adjacent two of the input terminals,
    the voltage detection circuit detects a voltage between the adjacent two of the input terminals,
    the upper node of the cell adjacent to an upper side of the conductive connection member is connected to the i-th input terminal via an i-th resistor, i being an integer of any one of 1 to n−5,
    the upper node of the conductive connection member is connected to the i+1th input terminal via an i+1th resistor, and is connected to the i+2th input terminal via an i+2th resistor,
    the lower node of the conductive connection member is connected to the i+3th input terminal via an i+3th resistor, and is connected to the i+4th input terminal via an i+4th resistor,
    the lower node of the cell adjacent to a lower side of the conductive connection member is connected to the i+5th input terminal via an i+5th resistor,
    wherein
    the control circuit recognizes:
    a voltage between the i+1th input terminal and the i+2th input terminal, detected by the voltage detection circuit and
    a voltage between the i+3th input terminal and the i+4th input terminal, detected by the voltage detection circuit as useless voltages.

* * * * *